United States Patent
Devadoss et al.

(10) Patent No.: US 12,086,483 B1
(45) Date of Patent: Sep. 10, 2024

(54) USING LIDAR TO DEFINE PRINTABLE AREA FOR DOCUMENT PRINTING

(71) Applicant: Xerox Corporation, Norwalk, CT (US)

(72) Inventors: Shoban Kumar Jayaraj Devadoss, Chennai (IN); Pandiarajan Subramanian, Chennai (IN); Jeffrey A. Chester, Norwalk, CT (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/171,076

(22) Filed: Feb. 17, 2023

(51) Int. Cl.
*G06F 3/12* (2006.01)
*G01S 17/89* (2020.01)
*G06T 7/521* (2017.01)

(52) U.S. Cl.
CPC ............ *G06F 3/1243* (2013.01); *G01S 17/89* (2013.01); *G06F 3/1208* (2013.01); *G06F 3/1256* (2013.01); *G06T 7/521* (2017.01)

(58) Field of Classification Search
None
See application file for complete search history.

(56) References Cited

U.S. PATENT DOCUMENTS

| | | | | |
|---|---|---|---|---|
| 6,600,571 B1 * | 7/2003 | Ito | ........................ | G06T 1/0021 358/1.15 |
| 10,444,959 B2 * | 10/2019 | Dubois | ................... | G06F 16/54 |
| 11,062,184 B1 * | 7/2021 | Parsons | ................. | G06F 3/1208 |
| 2012/0105431 A1 | 5/2012 | Williams | | |
| 2015/0206349 A1 * | 7/2015 | Rosenthal | ............. | G06T 19/006 345/633 |
| 2021/0097771 A1 * | 4/2021 | Chyau | ..................... | G06T 15/04 |
| 2021/0232875 A1 * | 7/2021 | Parsons | ................. | G06F 3/1272 |
| 2021/0295118 A1 * | 9/2021 | Parsons | ................... | G06F 30/10 |
| 2022/0083290 A1 | 3/2022 | Kabu et al. | | |
| 2023/0290036 A1 * | 9/2023 | Tasse | ...................... | G06T 17/20 |

FOREIGN PATENT DOCUMENTS

| | | | | |
|---|---|---|---|---|
| CA | 3145415 C * | 3/2023 | ........... | G01S 13/426 |
| WO | WO-2015094321 A1 * | 6/2015 | ........... | G06F 3/1423 |

OTHER PUBLICATIONS

Jung, KR 2014-0133640, 2014, Clarivate Analytical, Machine Translation of Korean Patent Document (Year: 2014).*

* cited by examiner

*Primary Examiner* — Ted W Barnes
(74) *Attorney, Agent, or Firm* — Fox Rothschild LLP

(57) ABSTRACT

Method and systems for using augmented reality to create a printing template are disclosed. A mobile electronic device that includes a depth sensor and a display device will acquire and display an image of an environment. The depth sensor will acquire a three-dimensional (3D) representation of a target area within the environment. The system will process the 3D representation to identify a border and generate a surface map of the target area. The system will identify content to be placed on the target area and generate a print job to print the content on a substrate that is sized to fit within the border and conformable to the surface map.

18 Claims, 5 Drawing Sheets
(1 of 5 Drawing Sheet(s) Filed in Color)

USING LIDAR TO DEFINE PRINTABLE AREA FOR DOCUMENT PRINTING

BACKGROUND

The present disclosure relates to the field of custom printing and, in particular, to methods and systems for developing customized printing templates for documents that will be printed and applied to an existing surface.

When printing systems prepare to print a document, they typically use a printing template to define a border within which the content will be printed. The border typically has a size and shape that corresponds to (or at least is no larger than) that of a known substrate. However, not all printing applications involve predefined substrates. For example, a user may wish to print a poster to hang in a particular location in the user's office, home, or other location in which the poster is suitable for the size of the location. As another example, a commercial user may wish to print an advertisement or other image that will fit into an existing structure of a venue. In some situations, such as steps in a stadium, arena, or other entertainment venue, the location or structure may not be a two-dimensional, flat surface. In such locations custom print decals may be designed so that the image is split among multiple decals, which are then applied to multiple stair risers to form a collective image.

Currently, to define the borders of a printing template for a document to be printed in a unique location such as those described above, a user would need to manually measure the location and then customize the template for each document to be printed. This is a time-consuming and potentially error-prone process. In addition, while some print systems exist that use augmented reality or two-dimensional (2D) images of the environment to show how a document will appear in the environment, such systems cannot account for curved or other irregular surface areas, and they can have difficulty defining a target area in an environment where the lighting is not ideal for image capture. Therefore, better systems and methods for designing complex customized print templates for unique surfaces are needed.

SUMMARY

In various embodiments, this document describes a method for using augmented reality to create a printing template. In the method, a processor of a mobile electronic device that includes a depth sensor and a display device will cause the display device to display an image of an environment. The processor also will cause the depth sensor to acquire a three-dimensional (3D) representation of a target area within the environment, wherein the target area appears in the image. The processor of the mobile electronic device and/or a processor of another electronic device will: (i) process the 3D representation to identify a border and generate a surface map of the target area; (ii) identify content to be printed and placed on the target area in the environment; (iii) generate a print job that is configured to cause a print device to print the content on a substrate that is sized to fit within the border and conformable to the surface map; and (iv) cause the display device to show the content over the target area in the image.

Optionally, in the method above, a print device may process the print job to print the content on one or more substrates that are collectively sized to fit within the border and shaped to conform to the surface map.

Optionally, in any of the embodiments described above, one or more of the processors may save the image in association with the print job and include, in the print job, instructions to print the content on a first side of the substrate and to print the image on a second side of the substrate. Also optionally, a position sensor of the mobile electronic device may, within a time that is proximate to a time at which the depth sensor acquires the 3D representation of the target area, capture location data for the environment, and the one or more processors may then include in the print job instructions to print the content on a first side of the substrate and to print a location corresponding to the location data on a second side of the substrate.

Optionally, in any of the embodiments described above, one or more of the processors may save the image in association with the print job and, after the print device has used the print job to print the content on one or more substrates, cause the display device to display the image with the content placed on the target area.

Optionally, in any of the embodiments described above, the depth sensor may acquire the 3D representation. In addition, the device may receive, from a user via a user interface, a selection of the target area.

Optionally, in any of the embodiments described above, the depth sensor may comprise a LiDAR system, and causing the depth sensor to acquire the 3D representation of the target area may comprise causing the LiDAR system to generate a 3D mesh of the target area.

8 Optionally, in any of the embodiments described above, generating the print job may comprise applying the content to a printing template in which the content is scaled to fit within the border of the target area. In addition, generating the print job may further comprise distorting the content to fit the surface map of the target area.

Optionally, in any of the embodiments described above, the method may include, in connection with causing the depth sensor to acquire the 3D representation of the target area, outputting a prompt to guide a user of the device to move the device to a position that will enable the depth sensor to capture data for the target area from multiple angles.

The methods described above may be embodied in a system including a processor and memory containing programming instructions that, when executed, will cause the processor to implement the actions described above. The system also may include a mobile electronic device having a display device and a depth sensor. The system also may include a print device. The system also may include one or more additional electronic devices that are in communication with the mobile electronic device and/or the print device. Various embodiments also include a computer program product that contains such programming instructions, and a memory containing the computer program product.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to."

In this document, when terms such as "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Additional terms that are relevant to this disclosure will be defined at the end of this Detailed Description section.

Figure 1:
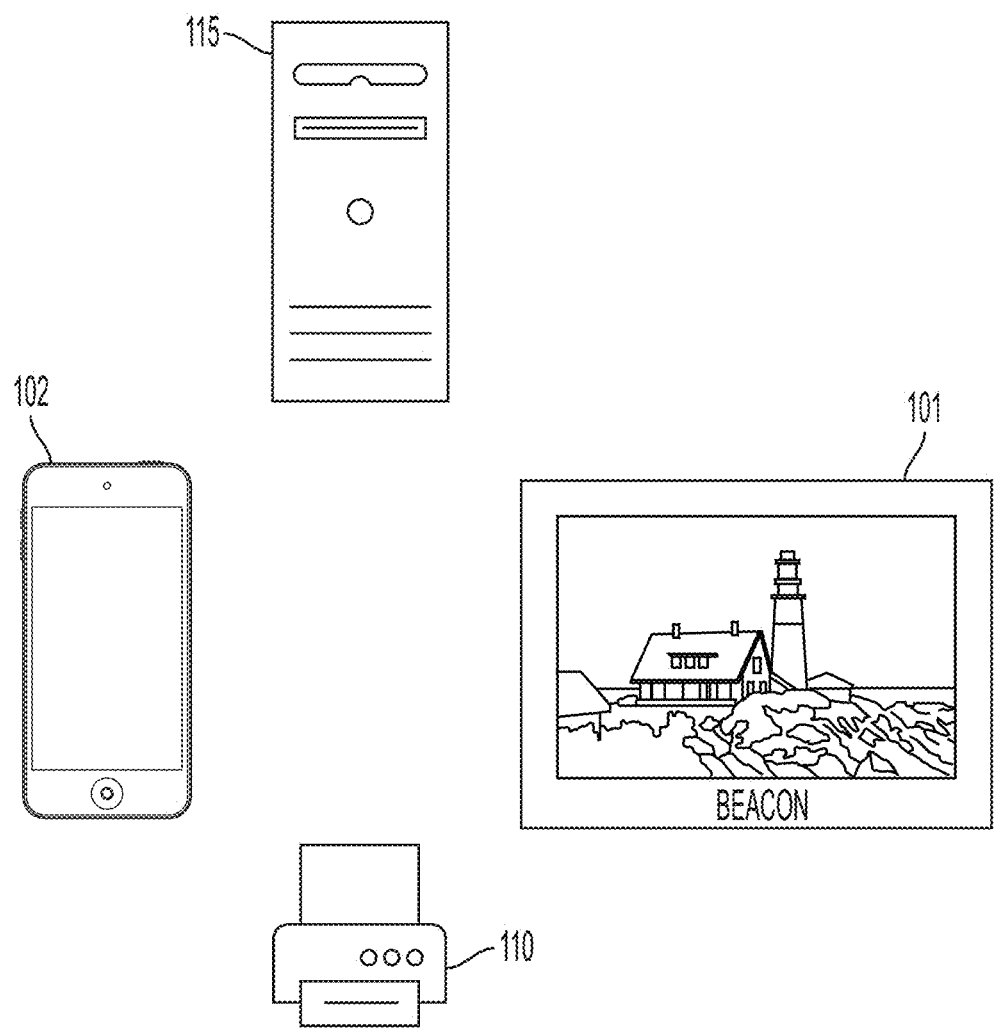
FIG. 1 illustrates various components of a system for generating a print job and printing a document corresponding to the print job.

FIG. 1 illustrates various components of a system that will be relevant to this disclosure. The system is used to print a document containing content 101, such as an image, that will be printed by a print device 110. A mobile electronic device 102 such as a smartphone or tablet computing device will, either on its own or in conjunction with a remote server 115, run a software application that captures information about an environment in which the content is to be placed. The software application will use the captured information to generate a print job that will size and format the document to fit and correspond to a target area in the environment, even if the target area is not a flat or strictly two-dimensional (2D) surface.

The electronic device 102 of FIG. 1 will include a depth sensor that can generate a three-dimensional representation of the surface of the target area. An example of such a depth sensor as is known in the art is a light detection and ranging (LiDAR) sensor, which includes one or more light emitters for emitting one or more beams of light, along with one or more photodetectors for detecting the beams of light after they are reflected by a surface. A LiDAR system can use the light's time of travel from emission to receipt as captured by the sensor to generate a three-dimensional representation of the surface. Personal electronic devices such as smartphones and tablet computing devices may incorporate such systems. For example, some smartphones include a depth sensor that emits a single light pulse and uses the pulse's time between emission and reflection to map an entire area, while other smartphones have depth sensors that generate multiple pulses of light to generate a more detailed and accurate map of the area. Depth sensors that emit a single pulse of light are commonly called time-of-flight (ToF) sensors, while depth sensors that can simultaneously emit multiple pulses of light at a single time are more commonly referred to as LiDAR systems. For simplicity, this document will use the term LiDAR to refer to systems that emit either a single pulse of light or multiple pulses of light.

Figure 2:
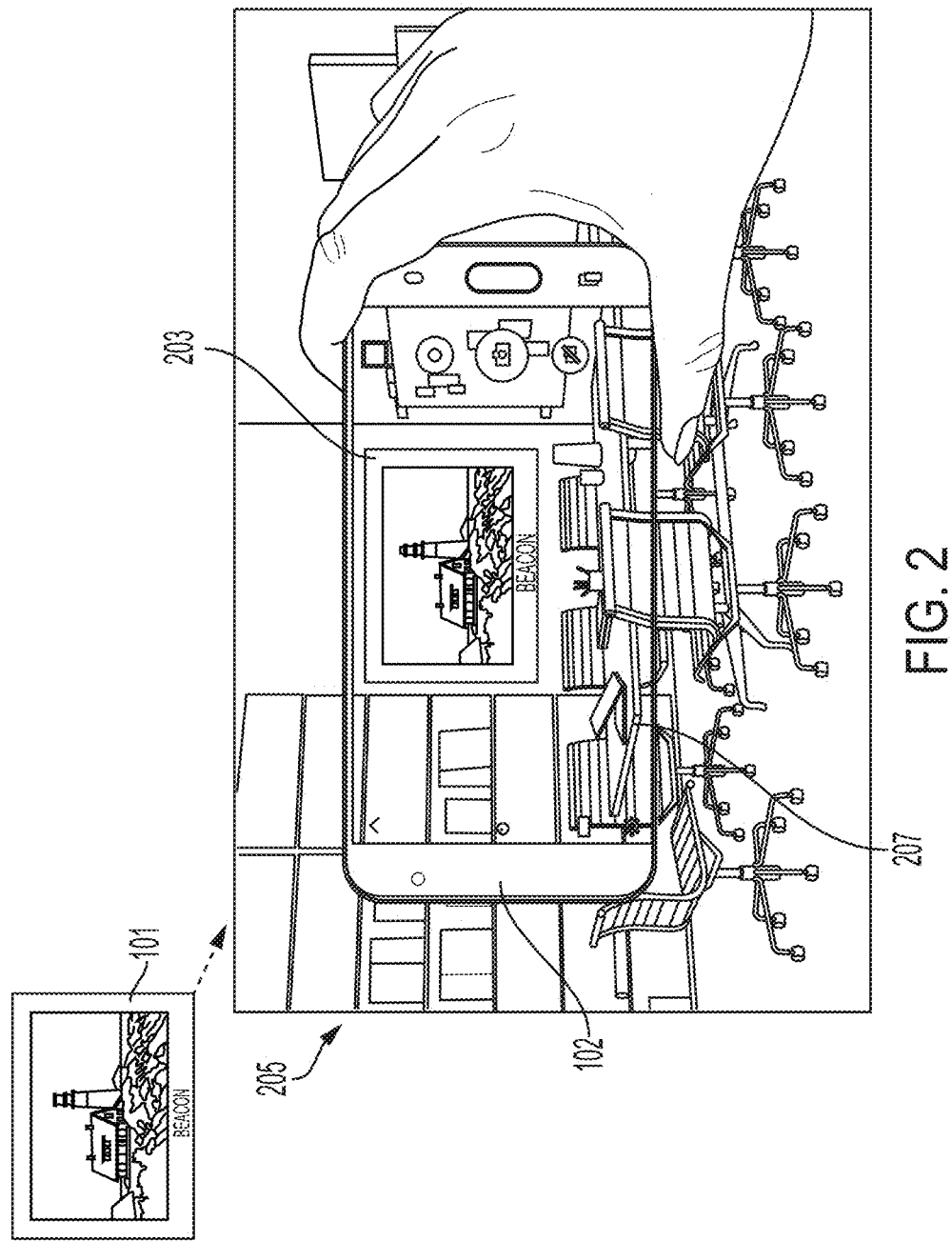
FIG. 2 illustrates an example application of the system to generate a print job that is appropriate for printing content for placement on a specified target area of an environment.

FIG. 2 illustrates how the system may operate to acquire parameters to generate the print job. In FIG. 2, the electronic device 102 is positioned so that its camera captures an image of an environment 205 such as an office, home, or other venue. The electronic device displays the image on its display device 207 in real-time as the image is captured. The system will identify a target area 203 in the environment. The target area will be defined by a bounding box, as shown by the boundaries of target area 203 in FIG. 2. In this example, the target area 203 is a segment of a wall. In practice, the target area may be a segment of any structure such as a shelf unit, a rear of a chair, or any other item in the environment. The target area also may be a combination of segments of multiple structures in the environment.

When the target area is defined, the system may augment the image on the display device 207 to show the content 101 positioned in the target area 203. In this way, the system uses augmented reality to show what the content 101 will look like when placed in the target area of the environment.

Figure 3:
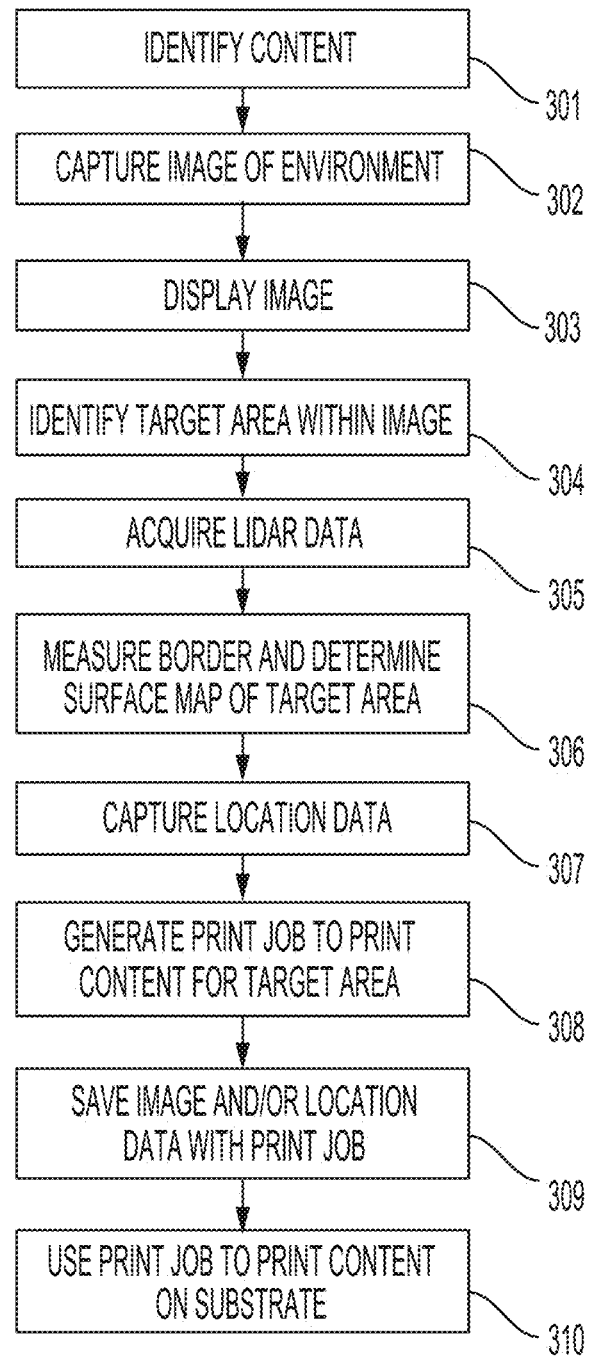
FIG. 3 is a flowchart illustrating a method of generating a print job that is for printing content for placement on a specified target area.

FIG. 3 illustrates a process by which the system may use the information acquired during the capture process of FIG. 2 to generate a print job for printing the content in a size and format that corresponds to the size and (if any) surface height variations of the target area. The system may implement the process of FIG. 3 by executing a software application that is stored on the mobile electronic device, on a remote server, or on a combination of the two. The ordering of the steps as shown in FIG. 3 is not intended to imply that the steps must be performed in the order shown. The steps shown may be re-ordered in any alternate configuration, and some steps may be performed simultaneously, except that steps that use data from a previous step must necessarily occur after the previous step.

At 301 the system identifies content to be printed. The system may do this in any suitable manner. For example, the software application may enable a user to load a document file that contains the content. The software application may include a library of content from which the user may select a stored content file. Alternatively, the software application may enable a user to provide an address (such as a uniform reference locator) or other location identifier that specifies a location from which the application may retrieve the content.

At 302 the mobile electronic device will capture an image of the environment, and at 303 the electronic device will display the image on the electronic device's display. The image may be a still image or a video sequence. The image capture may be performed by a camera of the electronic device so that the image is displayed in real-time as it is being captured. However, it is possible that a stored image can be used in at some parts of the process.

At 304 the system will identify a target area in the image. In some embodiments, the software application may generate a user interface via it will receive a user's selection of the target area, such as by drawing, placing, sizing, and/or otherwise defining a bounding box. The system may use the bounding box to calculate dimensions of the target area, using processes such as will be described below. In some embodiments, the system may enable definition of a target area as that corresponding to a surface of an object in the image. Other methods of defining target areas also may be used.

At 305 a LiDAR system of the mobile electronic device will acquire LiDAR data for the target area. The LIDAR data will include a 3D point cloud dataset that includes distances between the LiDAR emitter and various locations in the target area. As noted above, LiDAR systems can calculate these distances by measuring the time that it takes for each emitted light beam to travel from an emitter of the LiDAR system, to the surface of the target area, and back to a photoreceptor of the LiDAR system. The collection of LiDAR data may be triggered automatically when the target area is defined, or the application may prompt a user to start the LiDAR system.

Figure 4:
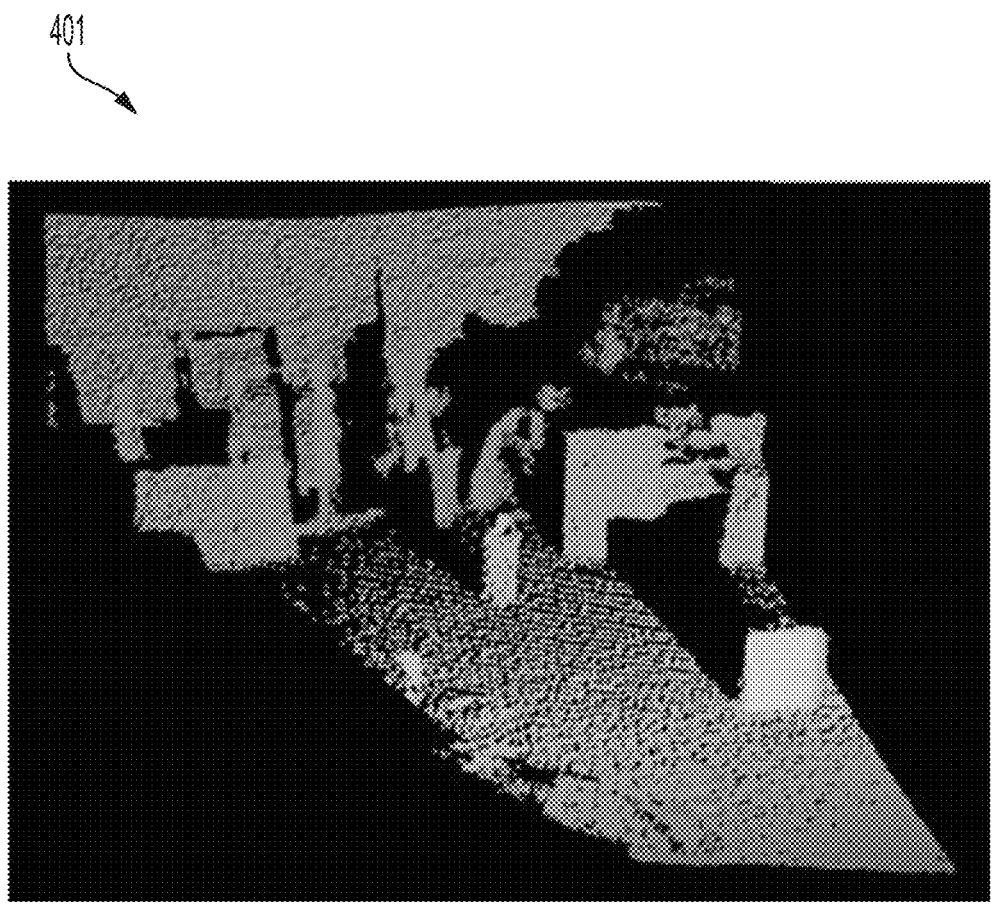
FIG. 4 illustrates an example surface map of a room as generated from a light detection and ranging (LiDAR) dataset.

At 306 the system will measure a border and determine a surface map of the target area. To generate the surface map of the target area in this step, the system will process the point cloud of the LiDAR dataset to generate provide a 3D map of the surface of the target area in x,y,z coordinates. An example surface map 401 of a room is shown in FIG. 4. In practice, the surface map may include variations in color to show differences in depth; in FIG. 4, shading and patterns are used to show this distinction in black-and-white to conform the image to Patent Office drawing requirements. Depending on the type of LiDAR system used, other measurements may be used in the calculation, such as laser scan angle, laser scan direction, and positional information from a position sensor. The LiDAR system also may use a trained machine learning model known as a classifier to classify the target area as being a particular type of object. The application also may include one or more other frameworks for performing object detection, such as the scale-invariant feature transform (SIFT) framework, the histogram of oriented gradients (HOG) framework, the Viola-Jones object detection framework, the single shot multibox detector (SSD) framework, and/or any other suitable framework for detecting and/or measuring objects in real world images.

To measure the border of the target area in step 306, the system may use information about one or more points of reference to measure the size of the target area's boundaries. For example, the system may ask a user to provide measurement characteristics for the boundaries. Alternatively, if the target area is a segment of an object having known dimensions, the system may ask the user to enter identifying information for the object, or the system may recognize the object using any now or hereafter known object detection methods, and the system may correlate the dimensions of the object with the dimensions of the target area and/or field of view. For example, the system may determine that a known object is 5 cm wide and takes up 5% of the horizontal dimension of the field of view. If so, the system may determine that the field of view has a horizontal dimension of 100 cm. Then, when the target appears in the field of view, the system may determine what percent of the field of view is taken by the horizontal dimension of the target area, and it may then multiply that percentage by the total field of view horizontal dimension (such as 100 cm) to determine the horizontal dimension of the target area. The system may use a similar calculation to determine the vertical dimension of the target area.

In addition to determining the dimensions of the border of the target area, the system will use the surface map to identify variations in depth of points within the target area. For example, when the user defines a bounding box, the system may analyze some or all of the points of the LiDAR point cloud that fall within that box. The system may create a mesh from those points and extract the normal of all of the points that are included in the mesh. The average normal of all points of a surface will provide an indication of the direction the surface is facing, which may be flat or positioned at an angle with respect to the device. Using the boundary dimensions and the surface normal, the system can create a rectangular plane and determine the size of, and surface variations within, the area in which content will be printed.

Optionally, the system also may identify the aspect ratio of the image to be printed. If the aspect ratio of the image does not match the aspect ratio of the target area, before fitting the image to the target area the system may provide the user an option to crop the image one or more edges, and the system will then fit the cropped image to the target area.

Optionally, at 307 the system also may use a sensor of the electronic device to identify the location of the device, and thus that of the environment. For example, the system may use a global positioning system (GPS) sensor of the electronic device, to capture coordinates of the environment, and it may correlate those coordinates to a location of the electronic device (and thus a location of the environment). Alternatively, the system may use its communication device to identify an address or other identifier of a wi-fi network to which it is connected, or it may use a near-field communication device to identify one or more other known devices that are in a communication range of the mobile electronic device, and it may query a data store to return a location that is associated with the detected network address or the detected device.

At 308 the system may generate a print job to print the content on a substrate that is sized to fit within the border and conformable to the surface map. The substrate itself may be of the size, or the printed content may be sized within the border so that the substrate can be trimmed around border so that the printed content fills the remaining portion of the substrate. The border measurements determined by the system, along with measurements for other features within the target area, enable a printing template to be generated which would accurately fit over the target area and that conforms to the shape and depth of the surface. For example, if the surface area includes multiple stair risers, the system may measure the boundaries of each stair riser and the relative depths of each of the stair risers. The system may use these measurements to alter the perspective of the image such that a viewer of the applied final print would accurately view the image from a particular perspective.

As another example, when generating the print job, the system may place cut locations (i.e., locations at which an image will be split) so that the segments of the images between cuts fit within regions of the surface map that all have a similar surface normal, and thus are oriented in substantially the same direction. When segments of the image are placed on those regions, the image will appear to be flat because the surfaces on which the segments are placed all face in substantially the same direction.

The system also may use other methods of identifying splits, folds, or other places at which the printed document will be wrapped around and/or segmented across a non-planar surface. UV mapping, in which a 3D model's surface is projected onto a 2D image for texture mapping, is one such known method. UV mapping processes are known and available in products such as the open-source graphics toolkit known as "Blender".

At 310 a print device will process the print job and print the content on the substrate, sized to fit within the target area and (if needed) distorted to conform to the surface map of the target area as specified by the print job file.

Optionally, before printing the print job, at 309 the system may save the image, the location data, or both in association with the print job. For example, the system may save these items in the print job itself, or in a data file having a pointer to the print job file, or two which the print job file points. If the system does this, then when printing the print job at 310, the printer may print the content on a first side of the substrate, and the printer may print the image and/or the location data on a second (opposite) side of the substrate.

Some or all of the processing steps described above may be done by the electronic device that captures the images, or by another electronic device that is in communication with the electronic device that captures the images. For example, the mobile electronic device may capture the images and LiDAR data and transmit that data to a remote server, to a communicatively connected print device, or to another device, in which case the other device may perform some or all of the processing steps that identify the target area and generate the print job.

Figure 5:
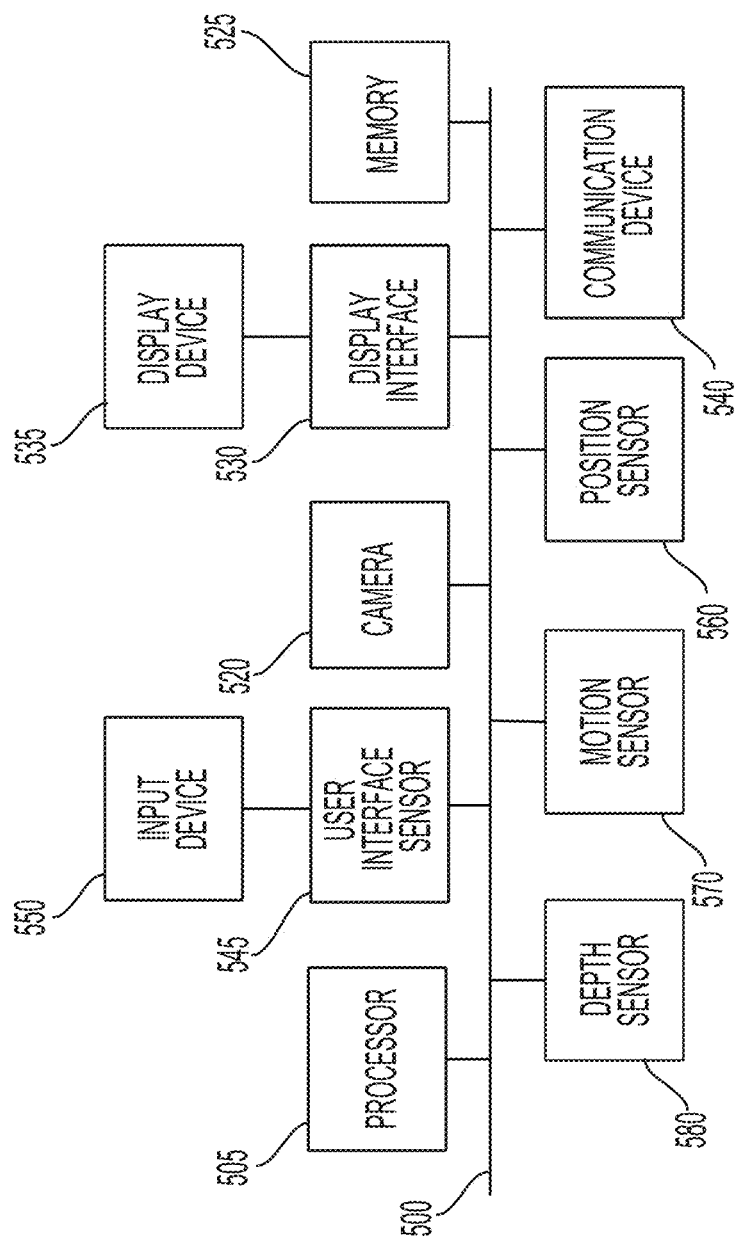
FIG. 5 illustrates example components of computing devices that may be incorporated into the system of FIG. 1.

FIG. 5 depicts an example of internal hardware that may be included in any of the electronic components of the system, such as the mobile electronic device 102, server 115, and/or print device 110 of FIG. 1. An electrical bus 500 serves as a communication path via which messages, instructions, data, or other information may be shared among the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525. A memory device may include a single device or a collection of devices across which data and/or instructions are stored.

The hardware may also include a user interface sensor 545 that allows for receipt of data from input devices 550 such as a keyboard, a mouse, a joystick, a touchscreen, a touch pad, a remote control, a pointing device and/or microphone.

The device will include multiple sensors for capturing data about the device's environment. A camera 520 will be configured to capture video and/or still images and save the images to digital files. A depth sensor 580 such as a LiDAR sensor will be configured to generate a three-dimensional representation of the surface. Additional information about LiDAR sensors is provided above. The device also may include a motion sensor 570 and a position sensor 560 that are configured to detect position and movement of the device. Examples of motion sensors 570 include gyroscopes or accelerometers. Examples of position sensors 560 include a global positioning system (GPS) sensor device that receives positional data from an external GPS network, as well as that of an inertial navigation system (INS).

A display interface 530 permit information captured by the system's sensors or generated by the system's processor to be displayed on a display device 535 in visual, graphic, and/or alphanumeric format. An audio interface and audio output (such as a speaker) also may be provided.

Communication with external devices may occur using various communication devices 540 such as a wireless antenna, a radio frequency identification (RFID) tag and/or short-range or near-field communication transceiver, each of which may optionally communicatively connect with other components of the device via one or more communication systems. The communication device 540 may be configured to be communicatively connected to a communications network, such as the Internet, a local area network or a cellular telephone data network.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. A "mobile" electronic device is an electronic device that is portable, either by being carried by a human or on its own initiative such as in an autonomous robotic device. Additional elements that may be included in electronic devices are discussed above in the context of FIG. 5.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The term "print device" refers to a machine having hardware capable of receiving a digital document file and use the information from the file and associated print instructions to print a document represented in the file on a substrate and produce a physical document. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. A print device may have additional capabilities such as scanning or faxing and thus may be a multifunction device.

A "print job" refers to a set of instructions and data that, when received by a print device, will cause the print device to print content from one or more document files onto a substrate. A print job may render the content in a format for which the print device is programmed to accept. Alternatively, the print device or an external conversion application may be configured to render the content into a format that will be understood by the print device. A print job will typically be formatted and saved to a memory as one or more computer-readable files.

The term "classifier" means machine learning model that is trained to assign a label or category to an object that is defined by a group of data points. Training of a classifier typically starts with a set of labeled (and optionally also unlabeled) training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LiDAR data, and/or other data.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method for using augmented reality to create a printing template, the method comprising:
   by a processor of a mobile electronic device that includes a depth sensor and a display device:
      causing the display device to display an image of an environment, and
      causing the depth sensor to acquire a three-dimensional (3D) representation of a target area of the environment that is within the image; and
   by the processor of the mobile electronic device and/or a processor of another electronic device:
      processing the 3D representation to identify a border and generate a surface map of the target area,
      identifying content to be printed and placed on the target area in the environment,
      by a position sensor of the mobile electronic device within a time that is proximate to a time at which the depth sensor acquires the 3D representation of the target area, capturing location data for the environment,
      generating a print job that is configured to cause a print device to print the content on a substrate that is sized to fit within the border and conformable to the surface map,
      including, in the print job, instructions to print the content on a first side of the substrate and to print a location corresponding to the location data on a second side of the substrate, and
      causing the display device to show the content over the target area in the image.

2. The method of claim 1, further comprising, by a print device, processing the print job to print the content on one or more substrates that are collectively sized to fit within the border and shaped to conform to the surface map.

3. The method of claim 1 further comprising, by one or more of the processors:
   saving the image in association with the print job; and
   including, in the print job, instructions to print the content on a first side of the substrate and to print the image on a second side of the substrate.

4. The method of claim 1 further comprising:
   saving the image in association with the print job; and
   after the print device has used the print job to print the content on one or more substrates, causing the display device to display the image with the content placed on the target area.

5. The method of claim 1, further comprising, prior to causing the depth sensor to acquire the 3D representation, receiving, via a user interface of the mobile electronic device, a selection of the target area.

6. The method of claim 1, wherein:
   the depth sensor comprises a LiDAR system, and
   causing the depth sensor to acquire the 3D representation of the target area comprises causing the LiDAR system to generate a 3D mesh of the target area.

7. The method of claim 1, wherein generating the print job comprises applying the content to a printing template in which the content is scaled to fit within the border of the target area.

8. The method of claim 7, wherein generating the print job further comprises distorting the content to fit the surface map of the target area.

9. The method of claim 1 further comprising, in connection with causing the depth sensor to acquire the 3D representation of the target area, outputting a prompt to guide a user of the mobile electronic device to move the device to a position that will enable the depth sensor to capture data for the target area from multiple angles.

10. A system for creating a printing template, the system comprising:
   a mobile electronic device, comprising:
      a depth sensor,
      a position sensor, and
      a display device; and
   a memory containing programming instructions that are configured to cause one or more processors to:
      cause the display to display an image of an environment,
      cause the depth sensor to acquire a three-dimensional (3D) representation of a target area of the environment that is within the image,
      process the 3D representation to identify a border and generate a surface map of the target area,
      identify content to be printed and placed on the target area in the environment,
      cause the position sensor to capture location data for the environment within a time that is proximate to a time at which the depth sensor acquires the 3D representation of the target area,
      generate a print job that is configured to cause a print device to print the content on a substrate that is sized to fit within the border and conformable to the surface map,
      include, in the print job, instructions to print the content on a first side of the substrate and to print a location corresponding to the location data on a second side of the substrate, and
      cause the display device to show the content over the target area in the image.

11. The system of claim 10, further comprising:
a print device; and
additional programming instructions that are configured to cause the print device to process the print job to print the content on one or more substrates that are collectively sized to fit within the border and shaped to conform to the surface map.

12. The system of claim 10, further comprising additional programming instructions that are configured to cause the one or more processors to:
save the image in association with the print job; and
include, in the print job, instructions to print the content on a first side of the substrate and to print the image on a second side of the substrate.

13. The system of claim 10, further comprising additional programming instructions configured to cause the one or more processors to:
save the image in association with the print job; and
after the print device has used the print job to print the content on one or more substrates, cause the display device to display the image with the content placed on the target area.

14. The system of claim 10, further comprising additional programming instructions configured to cause the one or more processors to, prior to causing the depth sensor to acquire the 3D representation, prompt a user to select the target area.

15. The system of claim 10, wherein:
the depth sensor comprises a LiDAR system, and
the instructions to cause the depth sensor to acquire the 3D representation of the target area comprise instructions to cause the LiDAR system to generate a 3D mesh of the target area.

16. The system of claim 10, wherein the instructions to generate the print job comprise instructions to:
apply the content to a printing template in which the content is scaled to fit within the border of the target area; and
distort the content to fit the surface map of the target area.

17. The system of claim 10, further comprising programming instructions to, in connection with causing the depth sensor to acquire the 3D representation of the target area, output a prompt to guide a user of the mobile electronic device to move the device to a position that will enable the depth sensor to capture data for the target area from multiple angles.

18. A computer program product comprising a memory and programming instructions that are configured to cause one or more processors to:

cause a display device of a mobile electronic device to display an image of an environment;

cause a depth sensor of the mobile electronic device to acquire a three-dimensional (3D) representation of a target area of the environment that is within the image;

process the 3D representation to identify a border and generate a surface map of the target area;

identify content to be printed and placed on the target area in the environment;

cause a position sensor of the mobile electronic device to capture location data for the environment within a time that is proximate to a time at which the depth sensor acquires the 3D representation of the target area;

generate a print job that is configured to cause a print device to print the content on a substrate that is sized to fit within the border and conformable to the surface map;

include, in the print job, instructions to print the content on a first side of the substrate and to print a location corresponding to the location data on a second side of the substrate; and cause the display device to show the content over the target area in the image.

* * * * *